United States Patent
Rhee et al.

(10) Patent No.: US 11,137,115 B2
(45) Date of Patent: Oct. 5, 2021

(54) STORAGE VESSEL FOR EXTREMELY LOW TEMPERATURE MATERIAL WITH CRYOGENIC JACKET

(71) Applicant: University of Seoul Industry Cooperation Foundation, Seoul (KR)

(72) Inventors: Gwanghoon Rhee, Seoul (KR); Gunwoo Kim, Seoul (KR); Seongsik Moon, Seoul (KR); Seongjae You, Seoul (KR); Seoyoung Kim, Seoul (KR); Sangtae Han, Yongin-si (KR); Jinhyuk Jang, Gwangmyeong-si (KR)

(73) Assignee: University of Seoul Industry Cooperation Foundation

( * ) Notice: Subject to any disclaimer, the term of this patent is extended or adjusted under 35 U.S.C. 154(b) by 204 days.

(21) Appl. No.: 16/252,400

(22) Filed: Jan. 18, 2019

(65) Prior Publication Data
US 2019/0226639 A1 Jul. 25, 2019

(30) Foreign Application Priority Data

Jan. 22, 2018 (KR) .......................... 10-2018-0007941

(51) Int. Cl.
*F17C 13/00* (2006.01)
*F17C 3/08* (2006.01)

(52) U.S. Cl.
CPC .............. *F17C 13/001* (2013.01); *F17C 3/08* (2013.01); *F17C 2201/0109* (2013.01);
(Continued)

(58) Field of Classification Search
CPC ............ F17C 13/001; F17C 2203/0391; F17C 2203/03; F17C 2203/0631;
(Continued)

(56) References Cited

U.S. PATENT DOCUMENTS 7,024,885 B2   4/2006 Villalobos
2006/0196876 A1*  9/2006 Rohwer ................... F17C 3/04
                                                                                220/560.12
(Continued)

FOREIGN PATENT DOCUMENTS

CN          1654562      *  8/2005
CN        100558833 C     11/2009
(Continued)

OTHER PUBLICATIONS

Paivanas, J.A., et al., "Multishielding—An Advanced Superinsulation Technique," K. D. Timmerhaus (ed.), Advances in Cryogenic Engineering, Plenum Press, New York 1965, 2 pages.

*Primary Examiner* — Steven A. Reynolds
*Assistant Examiner* — Javier A Pagan
(74) *Attorney, Agent, or Firm* — Renaissance IP Law Group LLP

(57) ABSTRACT

A storage vessel for an extremely low temperature material for reducing a vaporization rate by forming a plating layer at an outer surface of a discharge pipe thereof is provided. The storage vessel for an extremely low temperature material includes an inner container configured to store an extremely low temperature material of a liquefied state through a supply pipe in an inner receiving space; an outer container installed at a separated space at the outside of the inner container and having a vacuum port configured to enable the separated space to be a vacuum state; and a heat insulating member installed in a vacuum region between the inner container and the outer container to block a heat from being transferred to the inner container, wherein a discharge pipe connected to an outlet of the inner container and configured to vaporize and discharge an extremely low temperature material is disposed between the inner container and the outer container, and at an outer surface of the discharge pipe, a thermally conductive layer coated with a
(Continued)

highly conductive material having high thermal conductivity is formed. By a such a configuration, a heat applied to an outer container can be effectively blocked from being transferred to an inner container for storing an extremely low temperature material, and by reducing a vaporization rate of the extremely low temperature material by increasing a heat transfer area of a discharge pipe, a loss rate according to vaporization of the extremely low temperature material can be reduced and a separate cheap auxiliary extremely low temperature material in addition to the extremely low temperature material can be subsidiarily used for fuel or industrial use.

7 Claims, 12 Drawing Sheets

(52) U.S. Cl.
CPC .............. *F17C 2201/0114* (2013.01); *F17C 2201/0119* (2013.01); *F17C 2201/032* (2013.01); *F17C 2201/054* (2013.01); *F17C 2201/056* (2013.01); *F17C 2203/032* (2013.01); *F17C 2203/0308* (2013.01); *F17C 2203/0387* (2013.01); *F17C 2203/0391* (2013.01); *F17C 2203/0629* (2013.01); *F17C 2203/0631* (2013.01); *F17C 2203/0639* (2013.01); *F17C 2203/0648* (2013.01); *F17C 2203/0663* (2013.01); *F17C 2205/0308* (2013.01); *F17C 2205/0332* (2013.01); *F17C 2205/0338* (2013.01); *F17C 2205/0352* (2013.01); *F17C 2221/012* (2013.01); *F17C 2221/017* (2013.01); *F17C 2223/0161* (2013.01); *F17C 2223/033* (2013.01); *F17C 2223/047* (2013.01); *F17C 2260/033* (2013.01)

(58) Field of Classification Search
CPC ...... F17C 2203/0629; F17C 2203/0626; F17C 2203/0612; F17C 2203/0602; F17C 2203/06; F17C 2205/0352; F17C 2205/0355; F17C 2205/0302; F17C 2205/03; F17C 2223/0161; F17C 2223/0153; F17C 2223/00; F17C 2260/033; F17C 2260/031; F17C 2260/03
See application file for complete search history.

(56) References Cited

U.S. PATENT DOCUMENTS

2006/0218940 A1* 10/2006 Starkovich ............ F17C 11/005
62/45.1
2011/0302933 A1* 12/2011 Immel ................... F17C 11/005
62/51.1

FOREIGN PATENT DOCUMENTS

| JP | S56076800 | | 6/1981 |
|---|---|---|---|
| JP | 2011001992 A | | 1/2011 |
| JP | 2011001993 A | | 1/2011 |
| KR | 100710981 B1 | | 4/2007 |
| KR | 20070074486 A | | 7/2007 |
| KR | 100804789 B1 | | 2/2008 |
| KR | 100937520 B1 | | 1/2010 |
| KR | 20110053840 A | | 5/2011 |
| KR | 20130012335 A | | 2/2013 |
| KR | 101283703 B1 | | 7/2013 |
| KR | 101447525 B1 | | 10/2014 |
| KR | 20160026050 A | | 3/2016 |
| KR | 20160051177 A | | 5/2016 |
| KR | 20170020092 A | * | 2/2017 |
| KR | 101744284 B1 | | 6/2017 |

* cited by examiner

STORAGE VESSEL FOR EXTREMELY LOW TEMPERATURE MATERIAL WITH CRYOGENIC JACKET

CROSS-REFERENCE TO RELATED APPLICATION

This patent application claims the benefit of priority under 35 U.S.C. 119 of Korean Patent Application No. 10-2018-0007941, filed on Jan. 22, 2018, the contents of which are hereby incorporated by reference for all purposes as if fully set forth herein.

BACKGROUND

Technical Field

The present disclosure relates to a storage vessel for an extremely low temperature material for reducing a vaporization rate by forming a plating layer at an outer surface of a discharge pipe thereof.

Related Art

Nowadays, due to rapid industrialization and population growth, an energy demand has been continuously increasing. Accordingly, supply of alternative energy due to depletion of fossil fuels has been urgently required. In particular, while Korea consumes a large amount of energy in the top 10 in the world, more than 90% of use energy is dependent on foreign imports and thus energy securement measures are urgently required.

Therefore, hydrogen fuel is considered as attracting alternative energy to solve the complicated energy problems facing the world.

Such hydrogen fuel is the most abundant element next to carbon and nitrogen on the earth, is a clean energy source that generates only a very small amount of nitrogen oxides in combustion and that does not emit other pollutants at all, may be made using water of an abundant amount existing on the earth as a material, and is an optimum alternative energy source without concern of depletion because it is recycled to water after use.

The most important problem for using hydrogen fuel is a method of storing hydrogen, and the method includes a method of compressing and storing hydrogen fuel in a high-pressure gas cylinder, underground having geological characteristics, or a piping system, a method of absorbing and storing solid using metal hydride, carbon nanotubes, glass microspheres and the like, and a method of storing hydrogen fuel in a liquefied state in a container of an extremely low temperature (−253° C.) state.

Particularly, because hydrogen in a liquefied state is stored at an extremely low temperature, when a small amount of heat is transferred from an external heat source by conduction, convection, radiation, or the like, hydrogen vaporization is caused, and a loss rate according to hydrogen vaporization is changed according to a size and shape of a container and a form of an insulator.

In the prior art, in order to store liquefied hydrogen, a high-pressure/low-pressure hydrogen fuel storage vessel such as Korean Patent No. 0937520 has been proposed. As shown in FIG. 1, Korean Patent No. 0937520 discloses a structure having a double structure of an inner container 10 and an outer container 20 and in which an insulator 30 for insulation is provided between the inner container 10 and the outer container 20 and in which a charging port 40 for charging hydrogen fuel and a vacuum port 50 for forming a space between the inner container 10 and the outer container 20 in a vacuum state are each installed in the outer container 20.

However, in the conventional hydrogen fuel storage vessel, the insulator 30 is interposed between the inner container 10 and the outer container 20, but the insulator 30 does not effectively block a heat applied to the outer container 20 from being transferred to the inner container 10 that stores liquefied hydrogen and thus there is a problem that a loss rate increases due to hydrogen vaporization.

Prior Art Document

Korea Patent No. 10-0937520 (Date of Patent: Nov. 11, 2010)

SUMMARY

The present disclosure provides a storage vessel for an extremely low temperature material that effectively blocks a heat applied to an outer container from being transferred to an inner container that stores an extremely low temperature material such as liquefied hydrogen or liquefied helium and that reduces a loss rate according to vaporization of the extremely low temperature material by reducing a vaporization rate of the extremely low temperature material by increasing a heat conduction area of a discharge pipe.

In an aspect, a storage vessel for an extremely low temperature material includes an inner container configured to store an extremely low temperature material of a liquefied state through a supply pipe in an inner receiving space; an outer container installed at a separated space at the outside of the inner container and having a vacuum port configured to enable the separated space to be a vacuum state; and a heat insulating member installed in a vacuum region between the inner container and the outer container to block a heat from being transferred to the inner container, wherein a discharge pipe connected to an outlet of the inner container and configured to vaporize and discharge an extremely low temperature material is disposed between the inner container and the outer container, and at an outer surface of the discharge pipe, a thermally conductive layer coated with a highly conductive material having high thermal conductivity is formed to easily discharge a heat permeated between the container and the outer container to the outside through the discharge pipe, thereby reducing a vaporization rate of the extremely low temperature material.

At the inside of the heat insulating member, a shield film may be formed to prevent a heat from permeating into the inner container by absorbing a vaporized extremely low temperature material by transferring a portion of a heat permeated from the outside to the discharge pipe.

At an outer surface of the inner container, a heat blocking layer coated to reflect a radiant heat permeated from the outside by increasing emissivity may be formed.

The thermally conductive layer may be formed in a second half of the discharge pipe.

An end portion of the thermally conductive layer formed in a second half of the discharge pipe may maintain a gap from the outer container.

At the outside of the outer container, a cryogenic jacket configured to receive a separate auxiliary extremely low temperature material in addition to the extremely low temperature material may be provided to reduce a vaporization heat of the extremely low temperature material by changing a phase of the auxiliary extremely low temperature material by an external heat.

The cryogenic jacket may be formed integrally with the outer container, and in a space between an outer surface of the outer container and an inner surface of the cryogenic jacket, a space to receive the auxiliary extremely low temperature material may be formed.

The cryogenic jacket may be detachably formed from the outer container, and a receiving space of the auxiliary extremely low temperature material may be formed inside the cryogenic jacket.

The auxiliary extremely low temperature material may flow along a flow path flowing from a supply port to a discharge port along a partition wall formed in a spiral shape along a circumferential surface of the outer container.

The cryogenic jacket may be formed in a pipe-shaped jacket formed in a spiral shape along a circumferential surface of the outer container from a supply port to a discharge port.

DESCRIPTION OF EXEMPLARY EMBODIMENTS

Hereinafter, an exemplary embodiment of the present invention will be described in detail with reference to the accompanying drawings. The same reference numbers are used throughout the drawings to refer to the same or like parts. Further, detailed descriptions of well-known functions and structures incorporated herein may be omitted to avoid obscuring the subject matter of the present disclosure. Similarly, in the attached drawings, some constituent elements are shown in an exaggerated or schematic form or are omitted.

Figure 1:
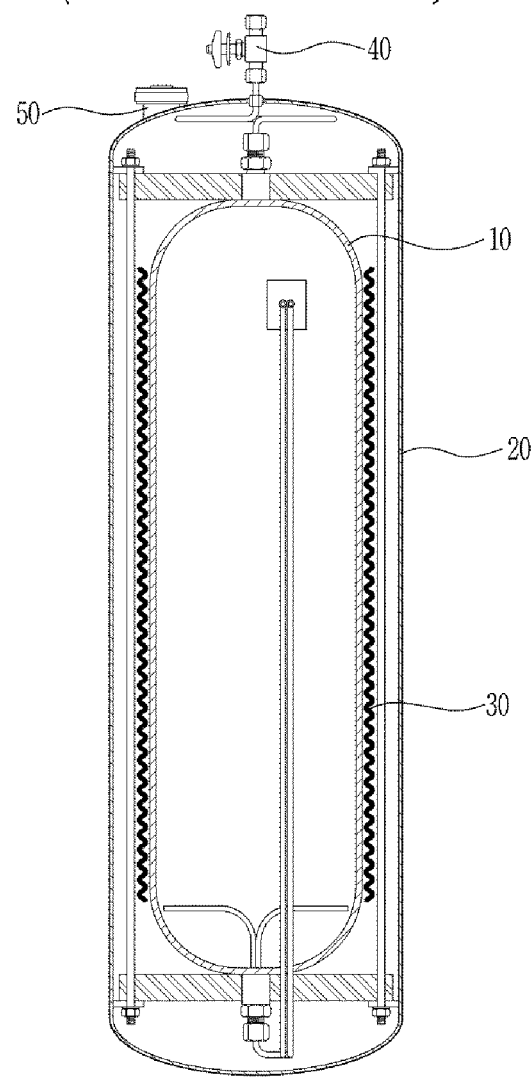
FIG. 1 is a cross-sectional view illustrating a conventional liquefied water storage vessel.
Figure 2:
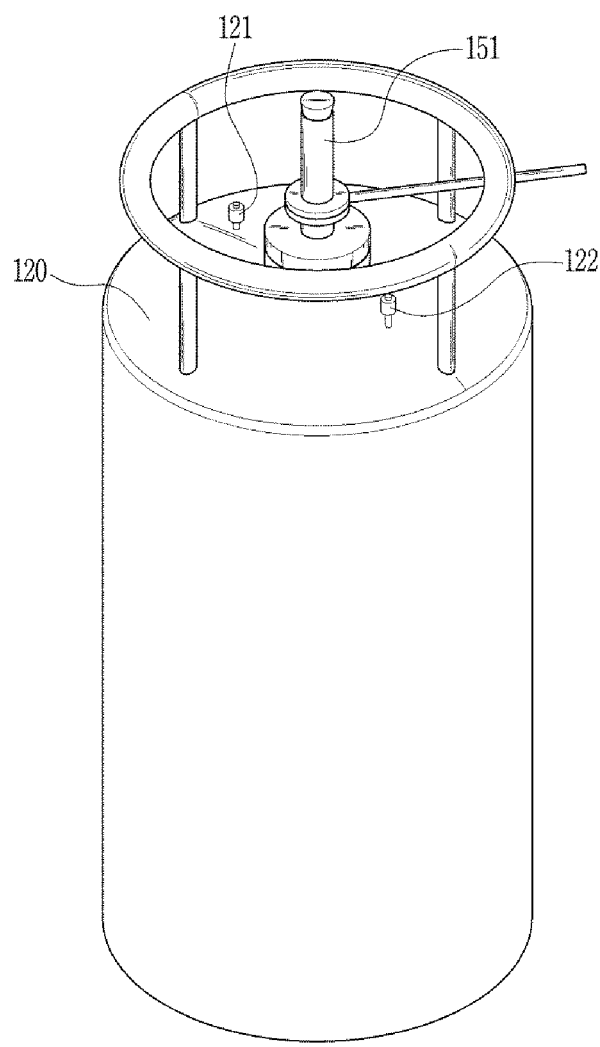
FIG. 2 is a perspective view illustrating a storage vessel for an extremely low temperature material according to a first embodiment of the present invention.
Figure 3:
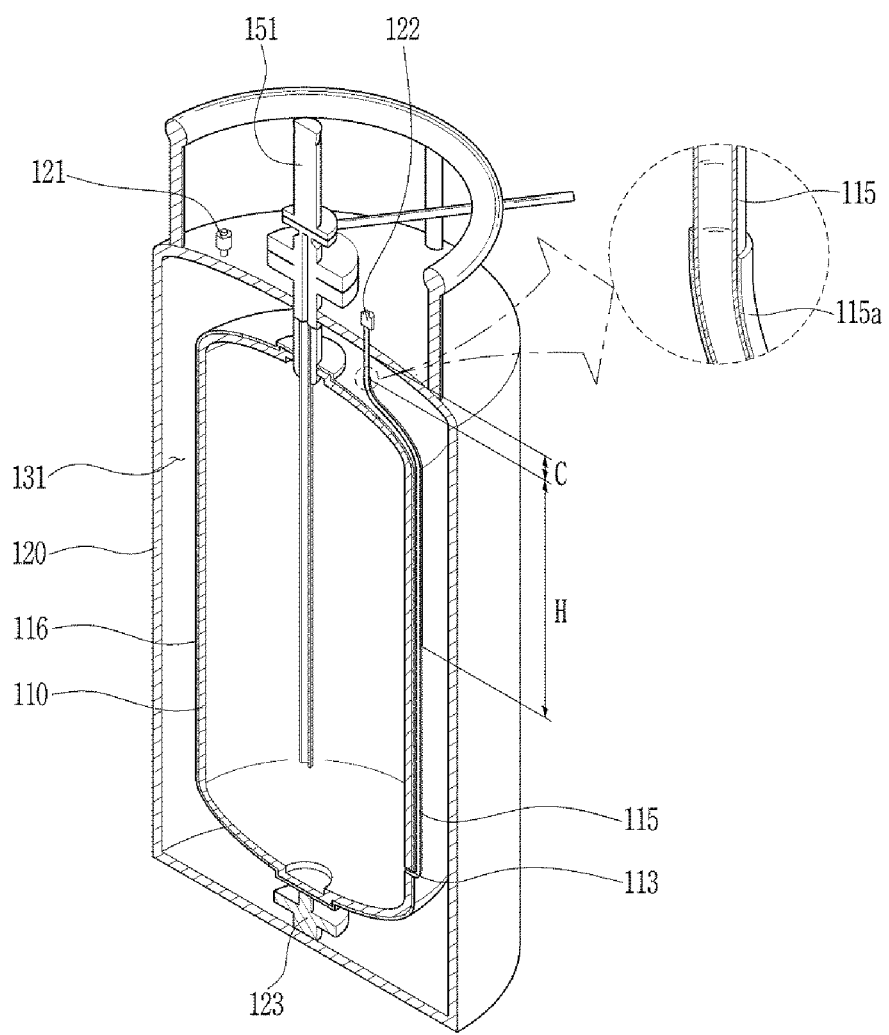
FIG. 3 is an exploded perspective view illustrating the storage vessel for an extremely low temperature material of FIG. 2.
Figure 4:
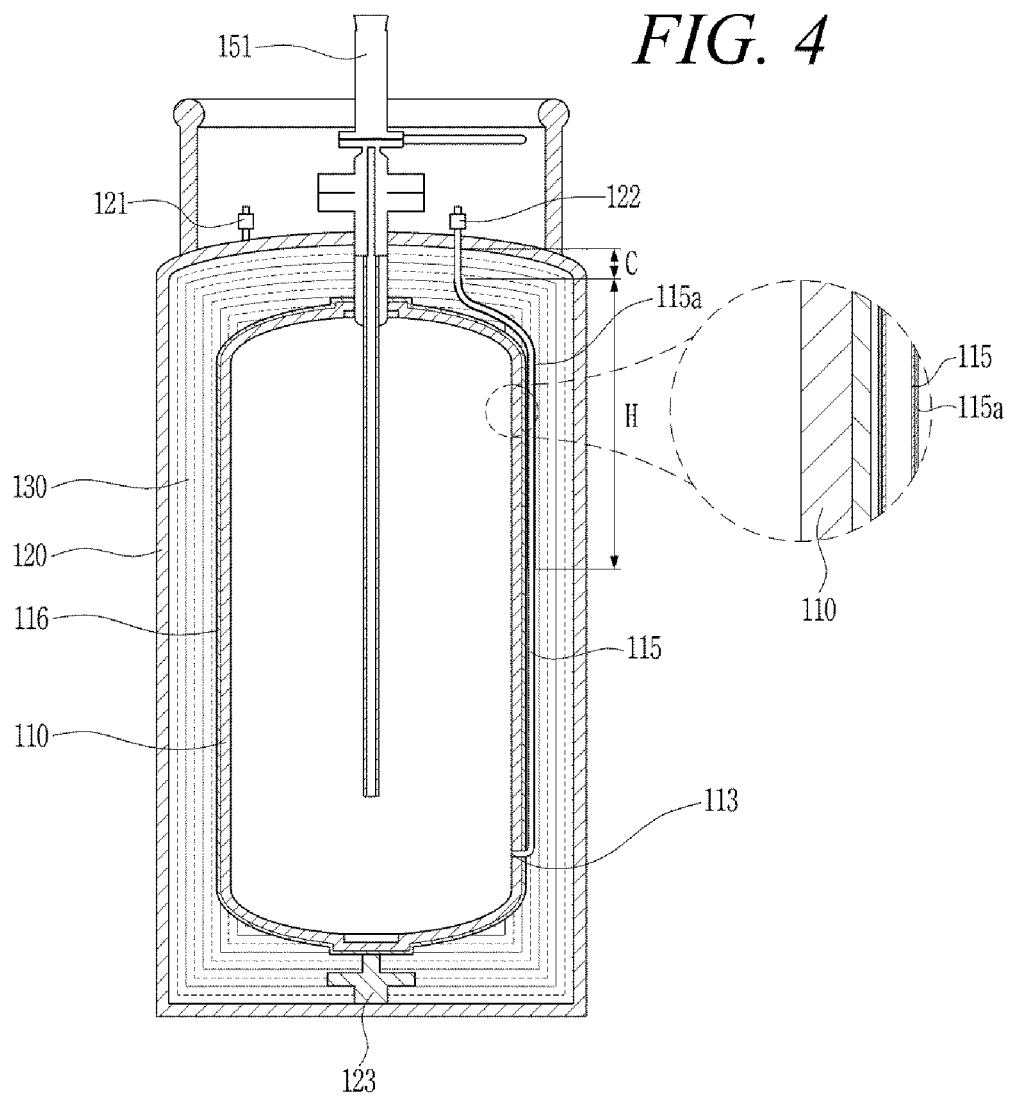
FIG. 4 is a cross-sectional view illustrating a storage vessel for an extremely low temperature material according to a first embodiment of the present invention.

FIG. 2 is a perspective view illustrating a storage vessel for an extremely low temperature material according to a first embodiment of the present invention, FIG. 3 is an exploded perspective view illustrating the storage vessel for an extremely low temperature material of FIG. 2, and FIG. 4 is a cross-sectional view illustrating a storage vessel for an extremely low temperature material according to a first embodiment of the present invention.

As shown in the figures, a storage vessel 100 for an extremely low temperature material according to the first embodiment of the present invention includes an inner container 110, an outer container 120, and a heat insulating member 130.

The inner container 110 is a container that stores an extremely low temperature material such as liquefied hydrogen or liquefied helium in an inner receiving space through a supply pipe 151. Liquefied hydrogen is stored at an extremely low temperature of, for example, −253° C. At an outer surface of the inner container 110, a heat blocking layer 116 coated to reflect a radiant heat permeated from the outside by increasing emissivity is formed. The heat blocking layer 116 is made of copper, chrome, or the like, and it is preferable to reinforce strength of the inner container 110 by closely winding a fiber material in a coil shape in an outer side wall of the inner container 110 in which the heat blocking layer 116 is formed.

The inner container 110 is provided with an outlet 113 for discharging the extremely low temperature material, and a discharge pipe 115 for discharging a vaporized extremely low temperature material gas to the outside of the outer container 120 is coupled to the outlet 113 to efficiently discharge the vaporized extremely low temperature material while preventing pressure increase in the inner container 110 according to vaporization of the extremely low temperature material.

The discharge pipe 115 is made of a material such as stainless steel, G10, or synthetic resin, and at an outer surface of the discharge pipe 115, a thermally conductive layer 115a coated with a highly conductive material such as copper having high thermal conductivity is formed to easily discharge a heat permeated between the inner container 110 and the outer container 120 to the outside through the discharge pipe 115, thereby reducing a vaporization rate of the extremely low temperature material. The thermally conductive layer 115a is formed at a second half of the discharge pipe 115 and has a height H of about ⅓ of that of the inner container 110, and an end portion of the thermally conductive layer 115a maintains a gap C from the outer container 120. The gap C formed between the end portion of the thermally conductive layer 115a and the outer container 120 serves to prevent a heat through the outer container 120 from being conducted toward the discharge pipe 115.

A relief valve 122 is provided at the outlet end of the discharge pipe 115 to enable the discharged extremely low temperature material gas to be discharged only when the discharged extremely low temperature material gas exceeds a preset pressure. A pressure setting value for opening the relief valve 122 is changed according to a material and structure of the inner container 110 and the outer container 120.

The outer container 120 is formed in a size to receive the inner container 110 in an inner space and is installed such that an inner surface of the outer container 120 and an outer surface of the inner container 110 are spaced from each other and thus a heat applied to the inner container 110 is prevented from being transferred to the inner container 110 by conduction, and the inner container 110 is prevented from being directly impacted.

At one side of the outer container 120, a vacuum port 121 for enabling a space between the inner container 110 and the outer container 120 to be in a vacuum state is provided and thus vacuum insulation through a vacuum region 131 is performed to prevent a heat applied to the outer container 120 from being transferred to the inner container 110 by convection.

At the lower end of the inside of the outer container 120, a fixing member 123 is installed to protrude inward from the inside to support the inner container 110. The fixing member 123 is made of a material that may prevent a heat of the outer container 120 from being transferred to the inner container 110 like an insulator. In this case, in order to absorb an external impact while safely supporting the inner container 110, a support plate for supporting both sides of the hemispherical-shaped inner container 110 between the inner container 110 and the outer container 120 and a buffering means for absorbing and mitigating an impact while supporting the support plate may be separately provided.

The heat insulating member 130 is installed in the vacuum region 131 between the inner container 110 and the outer container 120 to block a heat applied to the outer container 120 from being transferred to the inner container 110. Multi-layer insulation may be used for the heat insulating member 130, but the present invention is not limited thereto and known configurations such as a double shielding material of aluminum and glass fiber or aerogel may be used.

The inner container 110, the outer container 120, and the fixing member 123 each are made of a synthetic resin material and may be made of a material having high tensile strength such as austenitic-based steel, copper, and an aluminum alloy, having a low density, and having low reactivity with an extremely low temperature material in a room temperature. In particular, the fixing member 123 is preferably made of a material having low thermal conductivity so as not to transfer a heat through conduction.

The storage vessel 100 for an extremely low temperature material according to the first embodiment of the present invention more efficiently blocks an external heat permeated the heat insulating member 130 and the heat blocking layer 116 from permeating the inner container 110, thereby improving a heat insulation performance.

An extremely low temperature material gas discharged to the discharge pipe 115 through the outlet 113 enables a heat permeated from the outer container 120 to be easily discharged to the end of the discharge pipe 115 through a thermally conductive layer 115a coated on an outer surface of the discharge pipe 115 to reduce a vaporization rate of the extremely low temperature material and thus a loss rate due to vaporization of the extremely low temperature material can be effectively reduced. In particular, according to a structure of the present invention in which the end of the thermally conductive layer 115a formed in a second half of the discharge pipe 115 maintains a gap from the outer container 120, by preventing a heat from flowing back along a thermally conductive layer 115a having good thermal conductivity through the outer container 120, reduction of a vaporization rate and a loss rate can be effectively induced.

The storage vessel for an extremely low temperature material according to an embodiment of the present invention is advantageous for small capacity containers. The smaller a capacity as in the case of a container having a small capacity of about 5 L, the larger a vaporization rate. In this way, the present invention exhibits a higher effect in a container of a small capacity having a large vaporization rate. Therefore, for an unmanned aerial vehicle having a limitation in a capacity or size such as a drone, a storage vessel for an extremely low temperature material of the present invention improves a heat insulation performance, thereby improving duration of flight of drones.

Figure 5:
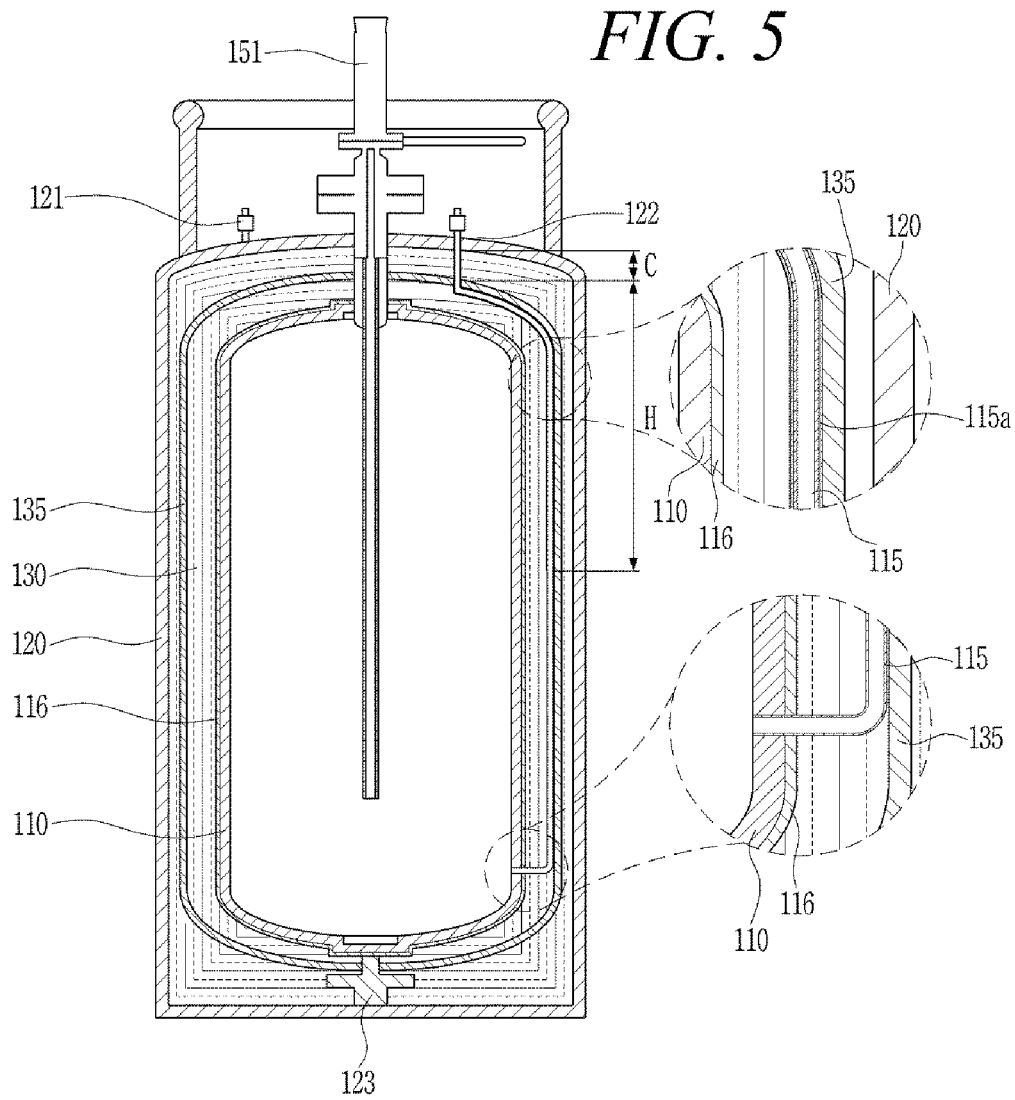
FIG. 5 is a cross-sectional view illustrating a storage vessel for an extremely low temperature material according to a second embodiment of the present invention.

FIG. 5 is a cross-sectional view illustrating a storage vessel for an extremely low temperature material according to a second embodiment of the present invention.

As shown in FIG. 5, in addition to the configuration of the first embodiment, a storage vessel 200 for an extremely low temperature material according to the second embodiment of the present invention includes a shield film 135 for preventing a heat from permeating an inner container by enabling a vaporized extremely low temperature material to absorb a heat by transferring a portion of a heat permeated from the outside of an outer container 120 to a discharge pipe 115 inside a heat insulating member 130.

The shield film 135 is preferably made of a copper film having good thermal conductivity and comes in contact with a thermally conductive layer 115a at the outside of the discharge pipe 115 while enclosing an inner container 110 and a heat blocking layer 116. The remaining configurations of the second embodiment are the same as those of the first embodiment and therefore a detailed description thereof will be omitted.

The storage vessel for an extremely low temperature material of the second embodiment having the shield film 135 and the thermally conductive layer 115a may further reduce a vaporization heat and a loss rate.

Table 1 is a table comparing an amount of a permeation heat, a vaporization rate, and reduction of a vaporization rate by computational analysis in a conventional example having no thermally conductive layer and shield film, a comparative example having only a shield film, and a second embodiment having both a thermally conductive layer and a shield film. The shield film and the thermally conductive layer used a copper material, and an extremely low temperature material used liquefied hydrogen.

TABLE 1

|  | Conventional Example | Comparative Example | Second embodiment |
|---|---|---|---|
| Amount of permeation heat (Q) | 3.258 W | 2.827 W | 2.481 W |
| Vaporization rate (%/day) | 6.76 | 5.87 | 5.15 |
| Vaporization rate reduction (%) | — | −13.2 | −23.9 |

As shown in Table 1, in a case (Comparative Example) having only a shield film of a copper material compared with a conventional example having no thermally conductive layer of a copper material and shield film, a reduction in a vaporization rate of 13.2% was determined, and in a case (second embodiment) having a thermally conductive layer of a copper material and a shield film, a reduction in a vaporization rate of 23.9% was determined.

The shield film 135 of a copper material of the present embodiment (second embodiment) enables a vaporized extremely low temperature material to absorb a heat by transferring a portion of an amount of a permeation heat entered to the inside to the discharge pipe 115 that discharges a vaporized extremely low temperature material (hydrogen), thereby reducing an amount of an internal permeation heat. As a result of computational analysis, in a structure having only the shield film 135 of a copper material, 33.3% of an amount of a permeation heat entered from the outside was transferred to the discharge pipe 115, and in a structure having both the shield film 135 of a copper material and the thermally conductive layer 115*a*, 49.5% of an amount of a permeation heat entered from the outside was transferred to the discharge pipe 115.

Figure 6:
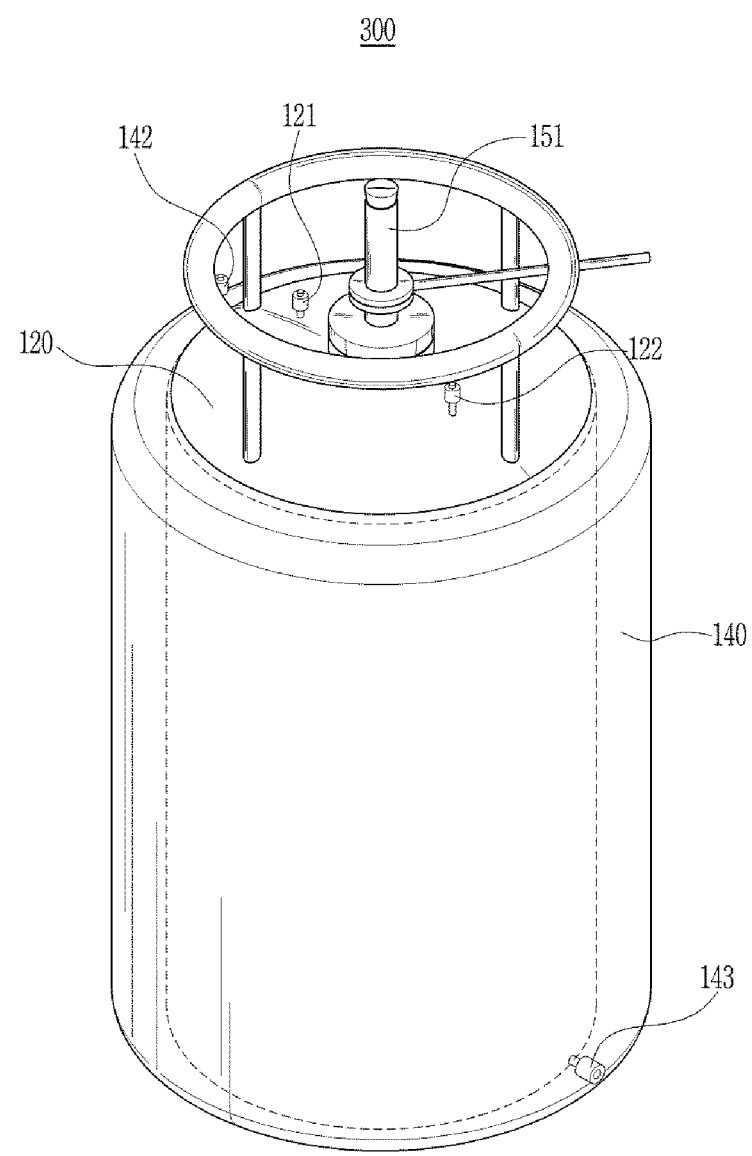
FIG. 6 is a perspective view illustrating a storage vessel for an extremely low temperature material according to a third embodiment of the present invention.
Figure 7:
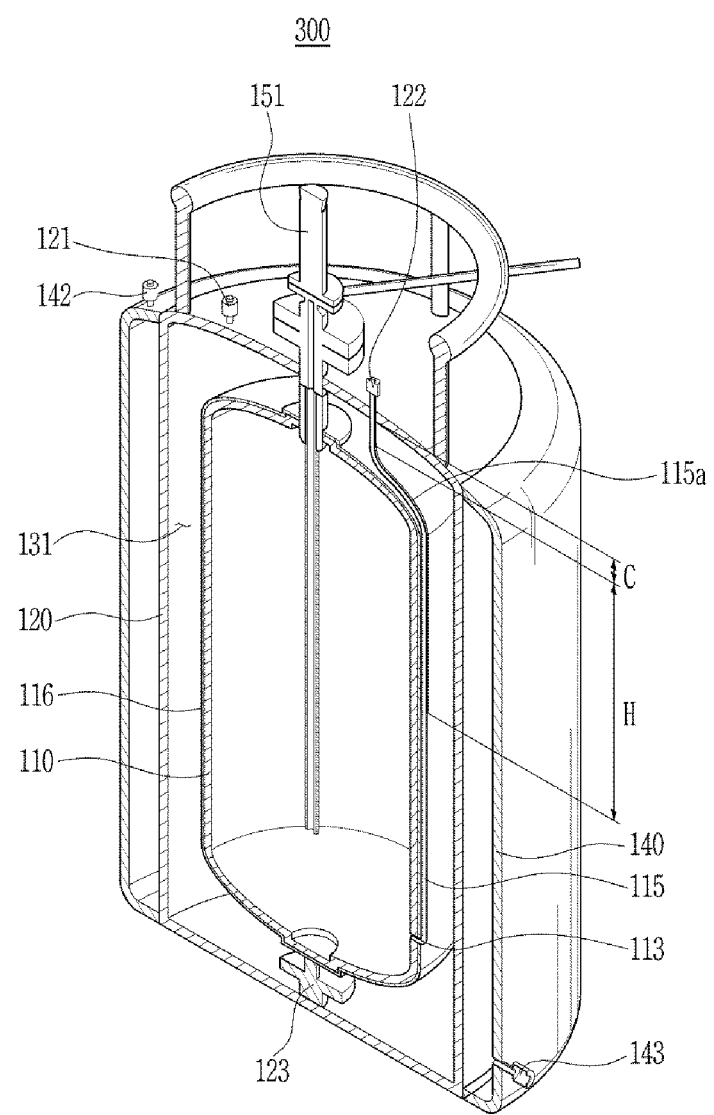
FIG. 7 is an exploded perspective view illustrating the storage vessel for an extremely low temperature material of FIG. 6.
Figure 8:
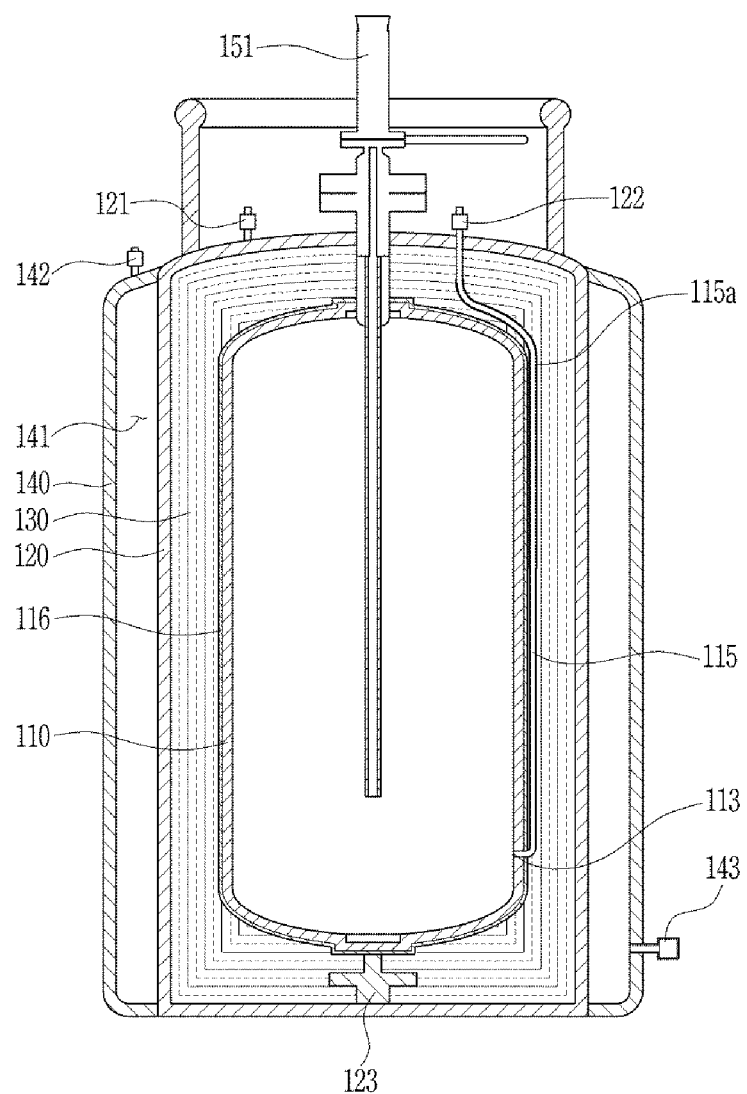
FIG. 8 is a cross-sectional view illustrating a storage vessel for an extremely low temperature material according to a third embodiment of the present invention.

FIG. 6 is a perspective view illustrating a storage vessel for an extremely low temperature material according to a third embodiment of the present invention, FIG. 7 is an exploded perspective view illustrating the storage vessel for an extremely low temperature material of FIG. 6, and FIG. 8 is a cross-sectional view illustrating a storage vessel for an extremely low temperature material according to a third embodiment of the present invention.

As shown in the figures, in addition to the configuration of the first embodiment, a storage vessel 300 for an extremely low temperature material according to the third embodiment of the present invention includes a cryogenic jacket 140 that receives a separate auxiliary extremely low temperature material in addition to the extremely low temperature material at the outside of an outer container 120 to have a structure that reduces a vaporization heat of an extremely low temperature material by changing a phase of the auxiliary extremely low temperature material by an external heat.

The cryogenic jacket 140 is a jacket that receives a separate relatively cheap auxiliary extremely low temperature material in addition to the extremely low temperature material (liquefied helium or liquefied hydrogen) and can reduce a vaporization heat of the extremely low temperature material (liquefied helium or liquefied hydrogen) with a cheap cost by changing a phase of the auxiliary extremely low temperature material by an external heat. Because the cryogenic jacket 140 is formed integrally with the outer container 120, the auxiliary extremely low temperature material is received in a space 141 between an outer surface of the outer container 120 and an inner surface of the cryogenic jacket 140.

In an upper portion of the cryogenic jacket 140, a supply port 142 for supplying the auxiliary extremely low temperature material is formed, and in a lower portion of the cryogenic jacket 140, a discharge port 143 for discharging a cheap auxiliary extremely low temperature material to be used for fuel or industrial use is formed. The supply port 142 and the discharge port 143 are provided with a regulating valve for regulating opening and closing and a relief valve for discharging only when a preset pressure is exceeded. The auxiliary extremely low temperature materials include liquefied oxygen, liquefied nitrogen, liquefied natural gas, and liquefied hydrogen compound. Therefore, the auxiliary extremely low temperature material may be subsidiarily used for medical, fuel, or industrial use while reducing a vaporization heat of extremely low temperature materials (liquefied helium or liquefied hydrogen). The remaining configurations of the third embodiment are the same as those of the first embodiment and therefore a detailed description thereof will be omitted.

In the storage vessel 300 for an extremely low temperature material according to the third embodiment of the present invention, a heat permeated from the outside changes a phase of a cheap auxiliary extremely low temperature material received in the cryogenic jacket 140 and thus a vaporization rate of an expensive extremely low temperature material (liquefied hydrogen or liquefied helium) stored in an inner container 110 is reduced, thereby reducing and protecting a vaporization amount of the extremely low temperature material. According to the third embodiment of the present invention, it is possible to reduce an amount of heat permeated to the inner container 110 by about 3 times, compared with the conventional 100 L class storage vessel for an extremely low temperature material (liquefied hydrogen) having a vaporization rate of 2%/day.

The cheap auxiliary extremely low temperature material received in the cryogenic jacket 140 discharges a gas vaporized by an external heat through the discharge port 143 while being continuously supplied through the supply port 142 to be subsidiarily used for medical, fuel, or industrial use. That is, by reducing a vaporization heat of the extremely low temperature material (liquefied helium or liquefied hydrogen) by the cheap auxiliary extremely low temperature material received in the cryogenic jacket 140 of the present invention, a loss rate due to vaporization of the extremely low temperature material (liquefied hydrogen or liquefied helium) can be reduced, and a separate cheap auxiliary extremely low temperature material in addition to liquefied helium or liquefied hydrogen can be subsidiarily used for fuel or industrial use.

Figure 9:
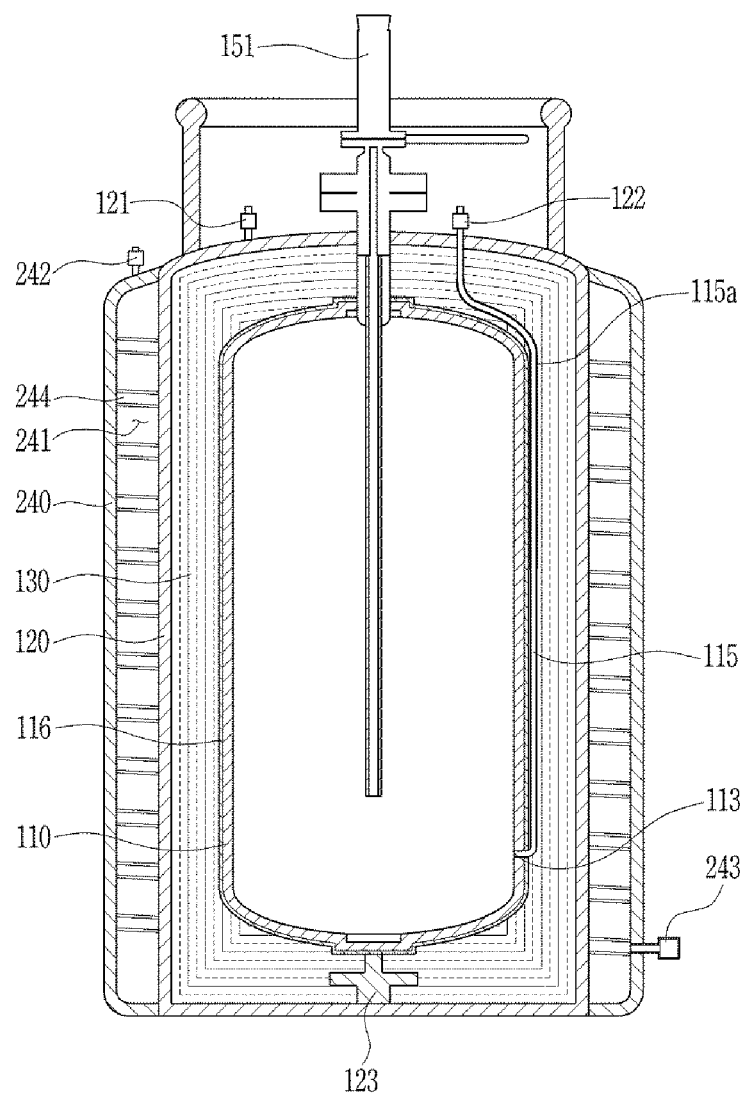
FIG. 9 is a cross-sectional view illustrating a storage vessel for an extremely low temperature material according to a fourth embodiment of the present invention.
Figure 10:
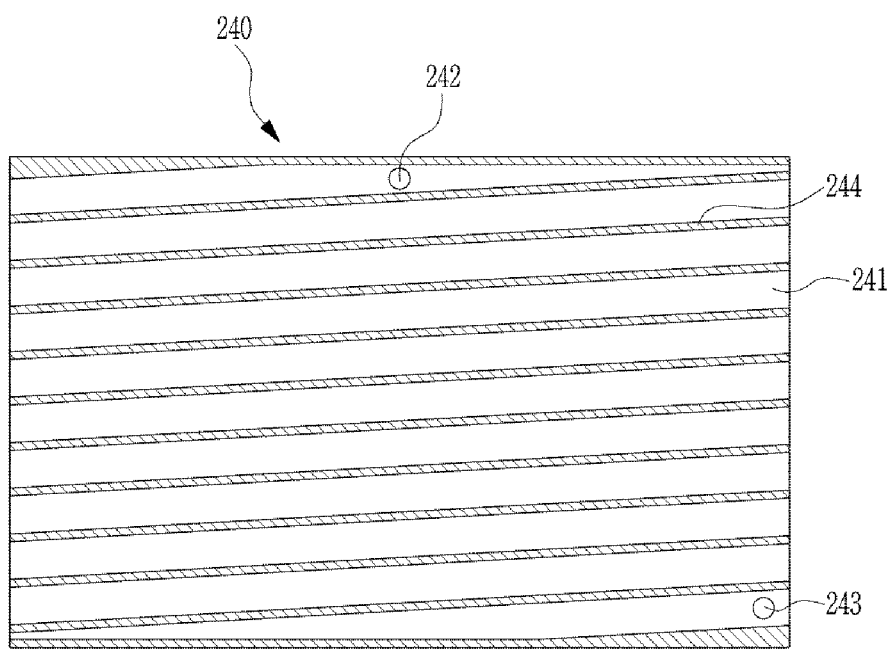
FIG. 10 is a development view illustrating a flow path of an auxiliary extremely low temperature material of a storage vessel for an extremely low temperature material according to a fourth embodiment of the present invention.

FIG. 9 is a cross-sectional view illustrating a storage vessel for an extremely low temperature material according to a fourth embodiment of the present invention, and FIG. 10 is a development view illustrating a flow path of an auxiliary extremely low temperature material of the storage vessel for an extremely low temperature material according to the fourth embodiment of the present invention.

As shown in the figures, in addition to the configuration of the first embodiment, a storage vessel 400 for an extremely low temperature material according to the fourth embodiment of the present invention includes a cryogenic jacket 240 that receives a separate auxiliary extremely low temperature material in addition to an extremely low temperature material is provided at the outside of an outer container 120 to have a structure that reduces a vaporization heat of the extremely low temperature material by changing a phase of the auxiliary extremely low temperature material by an external heat, and in the storage vessel 400 for an extremely low temperature material, in an upper portion of the cryogenic jacket 240, a supply port 242 for supplying the auxiliary extremely low temperature material is formed, in a lower portion of the cryogenic jacket 240, a discharge port 243 for discharging a cheap auxiliary extremely low temperature material to be used for fuel or industrial use is formed, and the auxiliary extremely low temperature material flows along a flow path 241 flowing from the supply port 242 to the discharge port 243 along a partition wall 244 formed in a spiral shape along a circumferential surface of an outer container.

The remaining configurations of the storage vessel 400 for an extremely low temperature material according to the fourth embodiment are the same as those of the storage vessel 300 for an extremely low temperature material according to the third embodiment and therefore a detailed description thereof will be omitted.

In the storage vessel 400 for an extremely low temperature material according to the fourth embodiment, the auxiliary extremely low temperature material is vaporized while moving from the supply port 242 to the discharge port 243 and thus the auxiliary extremely low temperature material in a vaporized state can be used, thereby increasing use efficiency thereof.

Figure 11:
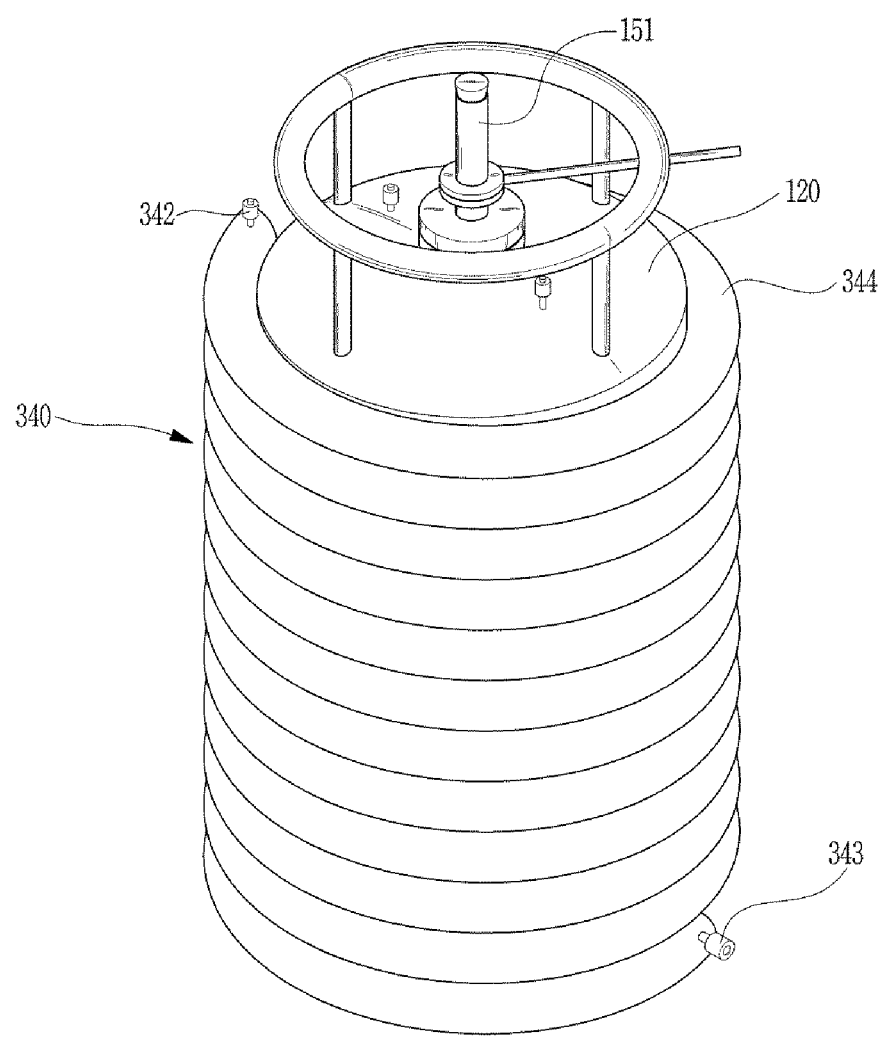
FIG. 11 is a perspective view illustrating a storage vessel for an extremely low temperature material according to a fifth embodiment of the present invention.

FIG. 11 is a perspective view illustrating a storage vessel for an extremely low temperature material according to a fifth embodiment of the present invention.

As shown in FIG. 11, in addition to the configuration of the first embodiment, a storage vessel 500 for an extremely low temperature material according to the fifth embodiment of the present invention includes a cryogenic jacket 340 that receives a separate auxiliary extremely low temperature material in addition to an extremely low temperature material at the outside of an outer container 120 to have a structure that reduces a vaporization heat of an extremely low temperature material by changing a phase of the auxiliary extremely low temperature material by an external heat, and a cryogenic jacket 340 of the storage vessel 500 for an extremely low temperature material is a pipe-shaped jacket, and at one end (upper end) of the cryogenic jacket 340, a supply port 342 for supplying an auxiliary extremely low temperature material is formed, at the other end (lower end) of the cryogenic jacket 340, a discharge port 343 for discharging a cheap auxiliary extremely low temperature material to be used for fuel or industrial use is formed, and the auxiliary extremely low temperature material flows along a flow path flowing from the supply port 342 to the discharge port 343 along a pipe 344 formed in a helical shape along a circumferential surface of the outer container 120.

The remaining configurations of the storage vessel 500 for an extremely low temperature material according to the fifth embodiment are the same as those of the storage vessel 300 for an extremely low temperature material according to the third embodiment and therefore a detailed description thereof will be omitted.

In the storage vessel 500 for an extremely low temperature material according to the fifth embodiment, because a flow path of the auxiliary extremely low temperature material similar to that of the storage vessel 400 for an extremely low temperature material according to the fourth embodiment is formed, the storage vessel 500 for an extremely low temperature material according to the fifth embodiment has an effect similar to that of the fourth embodiment. That is, because the auxiliary extremely low temperature material is vaporized while moving from the supply port 342 to the discharge port 343, the auxiliary extremely low temperature material in a vaporized state can be used, thereby increasing efficiency of use thereof.

Figure 12:
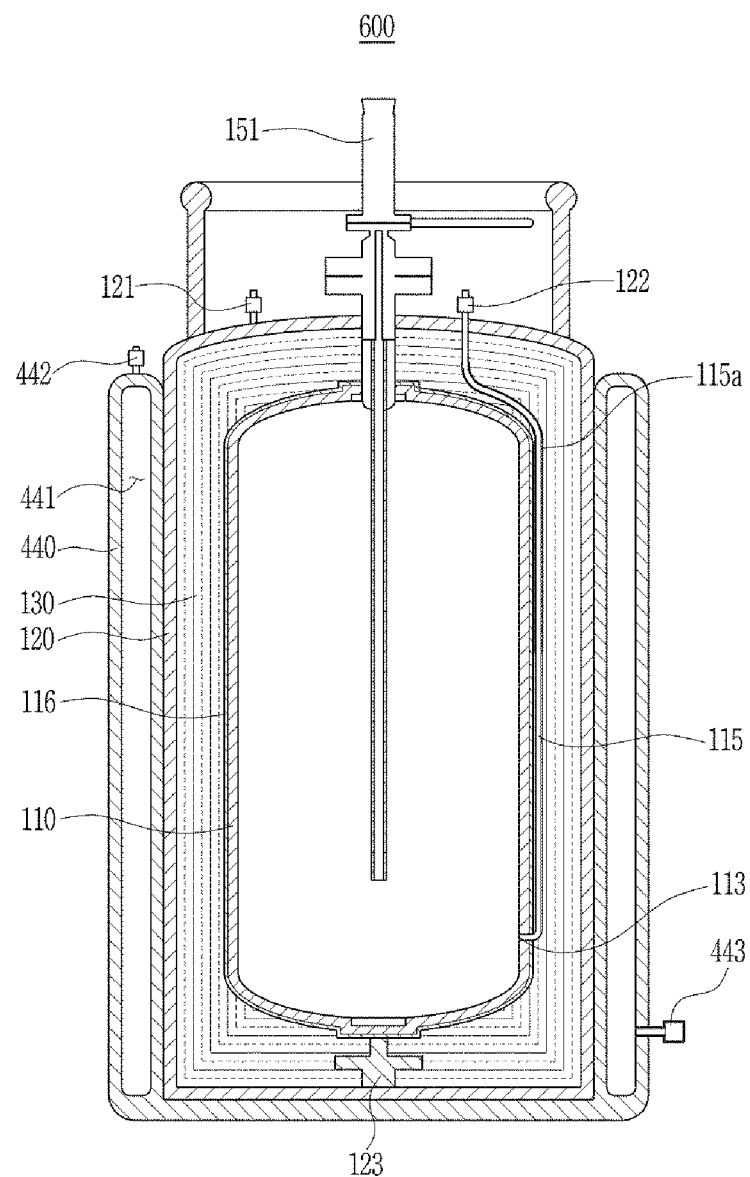
FIG. 12 is a cross-sectional view illustrating a storage vessel for an extremely low temperature material according to a sixth embodiment of the present invention.

FIG. 12 is a cross-sectional view illustrating a storage vessel for an extremely low temperature material according to a sixth embodiment of the present invention.

As shown in FIG. 12, in addition to the configuration of the first embodiment, a storage vessel 600 for an extremely low temperature material according to the sixth embodiment of the present invention includes a cryogenic jacket 440 that receives a separate auxiliary extremely low temperature material in addition to the extremely low temperature material at the outside of an outer container 120 to have a structure that reduces a vaporization heat of an extremely low temperature material by changing a phase of the auxiliary extremely low temperature material by an external heat, and the cryogenic jacket 440 is formed separately from the outer container 120 and thus a receiving space 441 of the auxiliary extremely low temperature material is formed within the cryogenic jacket 440. In an upper portion of the cryogenic jacket 440, a supply port 442 for supplying the auxiliary extremely low temperature material is formed, and in a lower portion of the cryogenic jacket 440, a discharge port 443 for discharging a cheap auxiliary extremely low temperature material to be used for fuel or industrial use is formed.

The remaining configurations of the storage vessel 600 for an extremely low temperature material having the cryogenic jacket according to the sixth embodiment are the same as those of the storage vessel 300 for an extremely low temperature material according to the third embodiment and therefore a detailed description thereof will be omitted.

In the storage vessel 600 for an extremely low temperature material having the cryogenic jacket according to the sixth embodiment, because the cryogenic jacket 440 may be easily separated from the outer container 120 or may be easily coupled to the outer container 120, the cryogenic jacket 440 can be easily separated and can be thus conveniently handled and transported, and the cryogenic jacket 440 can be conveniently used as a cryogenic vessel separate from the extremely low temperature material (liquefied hydrogen or liquefied helium).

It should be noted that the embodiments of the present invention disclosed in the present specification and drawings are only illustrative of the present invention and are not intended to limit the scope of the present invention. It is to be understood by those skilled in the art that other modifications based on the technical idea of the present invention are possible in addition to the embodiments disclosed herein.

According to a storage vessel for an extremely low temperature material of the present invention, a heat applied to an outer container can be effectively blocked from being transferred to an inner container for storing an extremely low temperature material, and by reducing a vaporization rate of the extremely low temperature material by increasing a heat transfer area of a discharge pipe, a loss rate according to vaporization of the extremely low temperature material can be reduced and a separate cheap auxiliary extremely low temperature material in addition to the extremely low temperature material can be subsidiarily used for fuel or industrial use.

What is claimed is:

1. A storage vessel for an extremely low temperature material, the storage vessel comprising:
   an inner container configured to store an extremely low temperature material of a liquefied state through a supply pipe in an inner receiving space;
   an outer container installed at a separated space at the outside of the inner container and having a vacuum port configured to enable the separated space to be a vacuum state; and
   a heat insulating member installed in a vacuum region between the inner container and the outer container to block a heat from being transferred to the inner container,
   wherein a discharge pipe connected to an outlet of the inner container and configured to vaporize and discharge an extremely low temperature material is disposed between the inner container and the outer container, and
   at an outer surface of the discharge pipe, a thermally conductive layer coated with a highly conductive material having high thermal conductivity is formed,
   wherein at an inside of the heat insulating member, a shield film comprising copper is formed to prevent a heat from permeating into the inner container by absorbing a vaporized extremely low temperature material by transferring a portion of a heat permeated from the outside to the discharge pipe, wherein the shield film comes in contact with a thermally conductive layer at the outside of the discharge pipe while enclosing an inner container, wherein the thermally conductive layer is formed in a second half of the discharge pipe, and an end portion of the thermally conductive layer formed in the second half of the discharge pipe maintains a gap from the outer container.

2. The storage vessel of claim 1, wherein at an outer surface of the inner container, a heat blocking layer coated to reflect a radiant heat permeated from the outside by increasing emissivity is formed.

3. The storage vessel of claim 1, wherein at the outside of the outer container, a cryogenic jacket configured to receive a separate auxiliary extremely low temperature material in addition to the extremely low temperature material is provided to reduce a vaporization heat of the extremely low temperature material by changing a phase of the auxiliary extremely low temperature material by an external heat.

4. The storage vessel of claim 3, wherein the cryogenic jacket is formed integrally with the outer container, and in a space between an outer surface of the outer container and an inner surface of the cryogenic jacket, a space to receive the auxiliary extremely low temperature material is formed.

5. The storage vessel of claim 3, wherein the cryogenic jacket is detachably formed from the outer container, and a receiving space of the auxiliary extremely low temperature material is formed inside the cryogenic jacket.

6. The storage vessel of claim 3, wherein the auxiliary extremely low temperature material flows along a flow path flowing from a supply port to a discharge port along a partition wall formed in a spiral shape along a circumferential surface of the outer container.

7. The storage vessel of claim 3, wherein the cryogenic jacket is formed in a pipe-shaped jacket formed in a spiral shape along a circumferential surface of the outer container from a supply port to a discharge port.

* * * * *